(12) United States Patent
Steinberg et al.

(10) Patent No.: US 8,649,604 B2
(45) Date of Patent: Feb. 11, 2014

(54) FACE SEARCHING AND DETECTION IN A DIGITAL IMAGE ACQUISITION DEVICE

(75) Inventors: Eran Steinberg, San Francisco, CA (US); Petronel Bigioi, Galway (IE); Peter Corcoran, Claregalway (IE); Mihnea Gangea, Bucharest (RO); Stefan Mirel Petrescu, Bucharest (RO); Andrei Vasiliu, Bucharest (RO); Gabriel Costache, Galway (IE); Alexandru Drimbarean, Galway (IE)

(73) Assignee: DigitalOptics Corporation Europe Limited, Ballybrit, Galway, (IE)

( * ) Notice: Subject to any disclaimer, the term of this patent is extended or adjusted under 35 U.S.C. 154(b) by 442 days.

(21) Appl. No.: 12/374,040

(22) PCT Filed: Jul. 23, 2007

(86) PCT No.: PCT/EP2007/006540
§ 371 (c)(1),
(2), (4) Date: Jun. 28, 2010

(87) PCT Pub. No.: WO2008/107002
PCT Pub. Date: Sep. 12, 2008

(65) Prior Publication Data
US 2010/0272363 A1    Oct. 28, 2010

Related U.S. Application Data (60) Provisional application No. 60/892,883, filed on Mar. 5, 2007.

(51) Int. Cl.
*G06K 9/46*    (2006.01)

(52) U.S. Cl.
USPC .............. 382/190; 382/228; 382/118

(58) Field of Classification Search
USPC .................. 382/190, 228, 118
See application file for complete search history.

(56) References Cited

U.S. PATENT DOCUMENTS

| 4,047,187 A | 9/1977 | Mashimo et al. |
| 4,317,991 A | 3/1982 | Stauffer |

(Continued)

FOREIGN PATENT DOCUMENTS

| EP | 1128316 A1 | 8/2001 |
| EP | 1 626 569 | 2/2006 |

(Continued)

OTHER PUBLICATIONS

Bradski Gary et al., "Learning-Based Computer Vision with Intel's Open Source Computer Vision Library", Intel Technology, 2005, pp. 119-130, vol. 9—Issue 2.

(Continued)

*Primary Examiner* — Ruiping Li
(74) *Attorney, Agent, or Firm* — Hickman Palermo Truong Becker Bingham Wong LLP (57) ABSTRACT

A method of detecting a face in an image includes performing face detection within a first window of the image at a first location. A confidence level is obtained from the face detection indicating a probability of the image including a face at or in the vicinity of the first location. Face detection is then performed within a second window at a second location, wherein the second location is determined based on the confidence level.

27 Claims, 4 Drawing Sheets

(56) References Cited

U.S. PATENT DOCUMENTS

| | | |
|---|---|---|
| 4,367,027 A | 1/1983 | Stauffer |
| RE31,370 E | 9/1983 | Mashimo et al. |
| 4,448,510 A | 5/1984 | Murakoshi |
| 4,638,364 A | 1/1987 | Hiramatsu |
| 4,796,043 A | 1/1989 | Izumi et al. |
| 4,853,788 A | 8/1989 | Murashima et al. |
| 4,922,346 A | 5/1990 | Hidaka et al. |
| 4,967,279 A | 10/1990 | Murashima |
| 4,970,663 A | 11/1990 | Bedell et al. |
| 4,970,683 A | 11/1990 | Harshaw et al. |
| 4,975,969 A | 12/1990 | Tal |
| 5,003,339 A | 3/1991 | Kikuchi et al. |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,803 A | 6/1998 | Jacquin et al. |
| 5,771,307 A | 6/1998 | Lu et al. |
| 5,774,129 A | 6/1998 | Poggio et al. |
| 5,774,747 A | 6/1998 | Ishihara et al. |
| 5,774,754 A | 6/1998 | Ootsuka |
| 5,781,650 A | 7/1998 | Lobo et al. |
| 5,790,710 A | 8/1998 | Price et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,463 A | 12/1998 | Horii |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,966,549 A | 10/1999 | Hara et al. |
| 5,978,519 A | 11/1999 | Bollman et al. |
| 5,982,912 A | 11/1999 | Fukui et al. |
| 5,991,456 A | 11/1999 | Rahman et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,215,898 B1 | 4/2001 | Woodfill et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,389,155 B2 | 5/2002 | Funayama et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,445,819 B1 | 9/2002 | Kinjo |
| 6,456,732 B1 | 9/2002 | Kimbell et al. |
| 6,456,737 B1 | 9/2002 | Woodfill et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,856,708 B1 | 2/2005 | Aoki |
| 6,876,755 B1 | 4/2005 | Taylor et al. |
| 6,879,705 B1 | 4/2005 | Tao et al. |
| 6,900,840 B1 | 5/2005 | Schinner et al. |

(56) References Cited

U.S. PATENT DOCUMENTS

| | | |
|---|---|---|
| 6,937,773 B1 | 8/2005 | Nozawa et al. |
| 6,940,545 B1 | 9/2005 | Ray et al. |
| 6,959,109 B2 | 10/2005 | Moustafa |
| 6,965,684 B2 | 11/2005 | Chen et al. |
| 6,977,687 B1 | 12/2005 | Suh |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,027,621 B1 | 4/2006 | Prokoski |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,511 B2 | 5/2006 | Lin |
| 7,043,465 B2 | 5/2006 | Pirim |
| 7,050,607 B2 | 5/2006 | Li et al. |
| 7,057,653 B1 | 6/2006 | Kubo |
| 7,064,776 B2 | 6/2006 | Sumi et al. |
| 7,082,212 B2 | 7/2006 | Liu et al. |
| 7,088,865 B2 | 8/2006 | Ejima et al. |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,190,829 B2 | 3/2007 | Zhang et al. |
| 7,194,114 B2 | 3/2007 | Schneiderman |
| 7,200,249 B2 | 4/2007 | Okubo et al. |
| 7,218,759 B1 | 5/2007 | Ho et al. |
| 7,221,805 B1 | 5/2007 | Bachelder |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,295,233 B2 | 11/2007 | Steinberg et al. |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,336,821 B2 | 2/2008 | Ciuc et al. |
| 7,362,368 B2 | 4/2008 | Steinberg et al. |
| 7,379,621 B2 | 5/2008 | Aoki |
| 7,394,943 B2 | 7/2008 | Kinney et al. |
| 7,403,643 B2 | 7/2008 | Ianculescu et al. |
| 7,440,593 B1 | 10/2008 | Steinberg et al. |
| 7,515,740 B2 | 4/2009 | Corcoran et al. |
| 7,565,030 B2 | 7/2009 | Steinberg et al. |
| 7,587,085 B2 | 9/2009 | Steinberg et al. |
| 7,590,305 B2 | 9/2009 | Steinberg et al. |
| 7,692,696 B2 | 4/2010 | Steinberg et al. |
| 7,715,597 B2 | 5/2010 | Costache et al. |
| 7,792,335 B2 | 9/2010 | Steinberg et al. |
| 7,844,076 B2 | 11/2010 | Corcoran et al. |
| 7,868,922 B2 | 1/2011 | Ciuc et al. |
| 7,889,886 B2 | 2/2011 | Matsugu et al. |
| 8,180,106 B2 | 5/2012 | Matsugu et al. |
| 2001/0005222 A1 | 6/2001 | Yamaguchi |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2002/0081026 A1 | 6/2002 | Izume et al. |
| 2002/0105662 A1 | 8/2002 | Patton et al. |
| 2002/0106114 A1 | 8/2002 | Yan et al. |
| 2002/0114535 A1 | 8/2002 | Luo |
| 2002/0118287 A1 | 8/2002 | Grosvenor et al. |
| 2002/0136433 A1 | 9/2002 | Lin |
| 2002/0150662 A1 | 10/2002 | Dewis et al. |
| 2002/0168108 A1 | 11/2002 | Loui et al. |
| 2002/0172419 A1 | 11/2002 | Lin et al. |
| 2002/0176609 A1 | 11/2002 | Hsieh et al. |
| 2002/0181801 A1 | 12/2002 | Needham et al. |
| 2002/0191861 A1 | 12/2002 | Cheatle |
| 2003/0023974 A1 | 1/2003 | Dagtas et al. |
| 2003/0025812 A1 | 2/2003 | Slatter |
| 2003/0035573 A1 | 2/2003 | Duta et al. |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0107649 A1 | 6/2003 | Flickner et al. |
| 2003/0118216 A1 | 6/2003 | Goldberg |
| 2003/0123713 A1 | 7/2003 | Geng |
| 2003/0123751 A1 | 7/2003 | Krishnamurthy et al. |
| 2003/0142209 A1 | 7/2003 | Yamazaki et al. |
| 2003/0151674 A1 | 8/2003 | Lin |
| 2003/0169907 A1 | 9/2003 | Edwards et al. |
| 2003/0202715 A1 | 10/2003 | Kinjo |
| 2004/0017938 A1* | 1/2004 | Cooper et al. ............... 382/171 |
| 2004/0022435 A1 | 2/2004 | Ishida |
| 2004/0095359 A1 | 5/2004 | Simon et al. |
| 2004/0120391 A1 | 6/2004 | Lin et al. |
| 2004/0120399 A1 | 6/2004 | Kato |
| 2004/0170397 A1 | 9/2004 | Ono |
| 2004/0175021 A1 | 9/2004 | Porter et al. |
| 2004/0179719 A1 | 9/2004 | Chen et al. |
| 2004/0218832 A1 | 11/2004 | Luo et al. |
| 2004/0223649 A1 | 11/2004 | Zacks et al. |
| 2004/0228505 A1 | 11/2004 | Sugimoto |
| 2004/0264744 A1 | 12/2004 | Zhang et al. |
| 2005/0013479 A1 | 1/2005 | Xiao et al. |
| 2005/0041121 A1 | 1/2005 | Player et al. |
| 2005/0275721 A1 | 2/2005 | Goshert |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0129278 A1 | 6/2005 | Rui et al. |
| 2005/0140801 A1 | 6/2005 | Prilutsky et al. |
| 2005/0185054 A1 | 8/2005 | Edwards et al. |
| 2006/0006077 A1 | 1/2006 | Mosher et al. |
| 2006/0008152 A1 | 1/2006 | Kumar et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0072811 A1 | 4/2006 | Porter et al. |
| 2006/0098875 A1 | 5/2006 | Sugimoto |
| 2006/0098890 A1 | 5/2006 | Steinberg et al. |
| 2006/0120599 A1 | 6/2006 | Steinberg et al. |
| 2006/0140455 A1 | 6/2006 | Costache et al. |
| 2006/0147192 A1 | 7/2006 | Zhang et al. |
| 2006/0177100 A1 | 8/2006 | Zhu et al. |
| 2006/0177131 A1 | 8/2006 | Porikli |
| 2006/0203106 A1 | 9/2006 | Lawrence et al. |
| 2006/0203107 A1 | 9/2006 | Steinberg et al. |
| 2006/0203108 A1 | 9/2006 | Steinberg et al. |
| 2006/0204034 A1 | 9/2006 | Steinberg et al. |
| 2006/0204054 A1 | 9/2006 | Steinberg et al. |
| 2006/0204055 A1 | 9/2006 | Steinberg et al. |
| 2006/0204056 A1 | 9/2006 | Steinberg et al. |
| 2006/0204057 A1 | 9/2006 | Steinberg |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0215924 A1 | 9/2006 | Steinberg et al. |

(56) References Cited

U.S. PATENT DOCUMENTS

| | | | |
|---|---|---|---|
| 2006/0257047 | A1 | 11/2006 | Kameyama et al. |
| 2006/0268150 | A1 | 11/2006 | Kameyama et al. |
| 2006/0269270 | A1 | 11/2006 | Yoda et al. |
| 2006/0280380 | A1 | 12/2006 | Li |
| 2006/0285754 | A1 | 12/2006 | Steinberg et al. |
| 2006/0291739 | A1 | 12/2006 | Li et al. |
| 2007/0018966 | A1 | 1/2007 | Blythe et al. |
| 2007/0070440 | A1 | 3/2007 | Li et al. |
| 2007/0071347 | A1 | 3/2007 | Li et al. |
| 2007/0091203 | A1 | 4/2007 | Peker et al. |
| 2007/0098303 | A1 | 5/2007 | Gallagher et al. |
| 2007/0110305 | A1 | 5/2007 | Corcoran et al. |
| 2007/0116379 | A1 | 5/2007 | Corcoran et al. |
| 2007/0116380 | A1 | 5/2007 | Ciuc et al. |
| 2007/0122056 | A1 | 5/2007 | Steinberg et al. |
| 2007/0133901 | A1 | 6/2007 | Aiso |
| 2007/0154095 | A1 | 7/2007 | Cao et al. |
| 2007/0154096 | A1 | 7/2007 | Cao et al. |
| 2007/0160307 | A1 | 7/2007 | Steinberg et al. |
| 2007/0189606 | A1 | 8/2007 | Ciuc et al. |
| 2007/0189748 | A1 | 8/2007 | Drimbarean et al. |
| 2007/0189757 | A1 | 8/2007 | Steinberg et al. |
| 2007/0201724 | A1 | 8/2007 | Steinberg et al. |
| 2007/0269108 | A1 | 11/2007 | Steinberg et al. |
| 2007/0296833 | A1 | 12/2007 | Corcoran et al. |
| 2008/0013798 | A1 | 1/2008 | Ionita et al. |
| 2008/0037827 | A1 | 2/2008 | Corcoran et al. |
| 2008/0037838 | A1 | 2/2008 | Ianculescu et al. |
| 2008/0037839 | A1 | 2/2008 | Corcoran et al. |
| 2008/0037840 | A1 | 2/2008 | Steinberg et al. |
| 2008/0043122 | A1 | 2/2008 | Steinberg et al. |
| 2008/0049970 | A1 | 2/2008 | Ciuc et al. |
| 2008/0055433 | A1 | 3/2008 | Steinberg et al. |
| 2008/0075385 | A1 | 3/2008 | David et al. |
| 2008/0107341 | A1* | 5/2008 | Lu .................. 382/190 |
| 2008/0144966 | A1 | 6/2008 | Steinberg et al. |
| 2008/0175481 | A1 | 7/2008 | Petrescu et al. |
| 2008/0205712 | A1 | 8/2008 | Ionita et al. |
| 2008/0240555 | A1 | 10/2008 | Nanu et al. |

FOREIGN PATENT DOCUMENTS

| | | |
|---|---|---|
| EP | 1626569 A1 * | 2/2006 |
| EP | 1887511 A1 | 2/2008 |
| GB | 2370438 A1 | 6/2002 |
| JP | 5260360 A2 | 10/1993 |
| JP | 2002-150287 A | 5/2002 |
| JP | 25164475 A2 | 6/2005 |
| JP | 26005662 A2 | 1/2006 |
| JP | 2006-508463 A | 3/2006 |
| JP | 26254358 A2 | 9/2006 |
| KR | 10-2005-0041772 A | 5/2005 |
| WO | WO-02052835 A2 | 7/2002 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO-2007142621 A1 | 12/2007 |
| WO | WO-2008015586 A2 | 2/2008 |
| WO | WO-2008015586 A3 | 2/2008 |
| WO | WO-2008018887 A1 | 2/2008 |
| WO | WO-2008023280 A2 | 2/2008 |
| WO | WO-2008104549 A2 | 9/2008 |
| WO | 2008/107002 A1 | 12/2008 |

OTHER PUBLICATIONS

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Xin He et al., "Real-Time Human Face Detection in Color Image", International Conference on Machine Learning and Cybernetics, 2003, pp. 2915-2920, vol. 5.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", Intl. Conference on Recent Advances in 3-D Digital Imaging and Modeling, 1997.

Beymer, D., "Pose-Invariant face Recognition Using Real and Virtual Views, A.I. Technical Report No. 1574", MA Institute of Technology Artificial Intelligence Lab., 1996, pp. 1-176.

Buenaposada, J., "Efficiently estimating 1-3,16 facial expression and illumination in appearance—based tracking, Retrieved from the Internet: URL:http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vison Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Crowley, J. et al., "Multi-modal tracking of faces for video communication, http://citeseer.ist.psu.edu/crowley97multimodal.html", In Computer Vision and Patent Recognition, 1997.

Dalton, John, "Digital Cameras and Electronic Color Image Acquisition, Abstract printed from http://csdl.computer.org/comp/proceedings/compcon/1996/7414/00/74140431abs.htm", C0MPC0N Spring '96—41st IEEE International Conference, 1996.

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Edwards, G.J. et al., "Advances in active appearance models", International Conference on Computer Vision (ICCV'99), 1999, pp. 137-142.

(56) References Cited

OTHER PUBLICATIONS

Edwards, G.J. et al., "Learning to identify and track faces in image sequences, Automatic Face and Gesture Recognition", IEEE Comput. Soc, 1998, pp. 260-265.

Fernandez, Anna T. et al., "Synthetic Elevation Beamforming and Image Acquisition Capabilities Using an 8× 128 1.75D Array, Abstract Printed from http://www.ieee-uffc.org/archive/uffc/trans/toc/abs/03/t0310040.htm", The Technical Institute of Electrical and Electronics Engineers.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 Intl. Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, T. S. et al., "3D Pose Estimation and Normalization for Face Recognition, A Thesis submitted to the Faculty of Graduate Studies and Research in Partial fulfillment of the requirements of the degree of Bachelor of Engineering", Dept. of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, M. et al., "Automated Multi-view 3D Image Acquisition in Human Genome Research, Abstract printed from http://csdl.computer.org/comp/proceedings/3pvt/2002/1521/00/15210091abs.htm", 1st Intl. Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al., "A CBIR Method Based on Color-Spatial Feature", IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, K. et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Nordstrom, M.M. et al., "The IMM face database an annotated dataset of 240 face images, http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT Intl. Search Report and Written Opinion of the Intl. Searching Authority, or the Declaration, for PCT App. No. PCT/US2006/021393, filed Jun. 2, 2006, paper dated Mar. 29, 2007, 12 pgs.

PCT Intl. Search Report and Written Opinion of the Intl. Searching Authority, or the Declaration, for PCT App. No. PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the Intl. Search Report and the Written Opinion of the Intl. Searching Authority, or the Declaration, for PCT/EP2008/001510, dated May 29, 2008, 13 pp.

PCT Notification of Transmittal of the Intl. Search Report and the Written Opinion of the Intl. Searching Authority, or the Declaration, for PCT/EP2008/052329, dated Sep. 15, 2008, 12 pages.

PCT Notification of Transmittal of the Intl. Search Report and the Written Opinion of the Intl. Searching Authority, or the Declaration, for PCT/IB2007/003724, dated Aug. 28, 2008, 9 pages.

Romdhani, S. et al., "Face Identification by Fitting a 3D Morphable Model using linear Shape and Texture Error Functions, XP003018283", European Conf. on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu et al., "Coarse-to-Fine Classification for Image-Based Face Detection", 1999, p. 92, subsection 8.3, Chapter 6, Carnegie Melon Univ.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

(56) References Cited

OTHER PUBLICATIONS

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.
Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.
Sim, T. et al., "The CMU Pose. Illumination, and Expression (PIE) Database of Human Faces Robotics Institute, Tech. Report, CMU-R1-TR-01-02", 2001, 18 pgs, Carnegie Mellon University.
Sim, T. et al., "The CMU Pose, Illumination, and Expression (PIE) database. Automatic Face and Gesture Recognition", Fifth IEEE Intl. Conf, IEEE Piscataway, NJ, USA, 2002, 6 pages.
Skocaj, D., "Range Image Acquisition of Objects with Non-Uniform Albedo Using Structured Light Range Sensor, Abstract printed from http://csdl.computer.org/comp/proceedings/icpr/2000/0750/01/07501778abs.htm", Intl. Conference on Pattern Recognition (ICPR '00), 2000, vol. 1.
Soriano, M. et al., "Making Saturated Facial Images Useful Again, XP002325961, ISSN: 0277-786X", Proceedings of The Spie, 1999, pp. 113-121, vol. 3826.
Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.
Stegmann, M.B. et al., "Multi-band modelling of appearance, XP009104697", Image and Vision Computing, 2003. pp. 61-67, vol. 21—Issue 1.
Stricker et al., "Similarity of color images". SPIE Proc, 1995, pp. 1-12. vol. 2420.
Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.
Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.
Tjahyadi et al., "Application of the DCT Energy Histogram for Face Recognition", Proceedings of the 2nd International Conference on Information Technology for Application, 2004, pp. 305-310.
Tkalcic, M. et al., "Colour spaces perceptual, historical and applicational background, ISBN: 0-7803-7763-X", IEEE, EUROCON, 2003, pp. 304-308, vol. 1.
Turk, Matthew et al., "Eigenfaces for Recognition", Journal of Cognitive Neuroscience, 1991, 17 pgs, vol. 3—Issue 1.
Twins Crack Face Recognition Puzzle, Internet article http://www.cnn.com/2003/TECH/ptech/03/10/israel.twins.reut/ index.html, printed Mar. 10, 2003, 3 pages.
U.S. Appl. No. 11/554,539, filed Oct. 30, 2006, entitled Digital Image Processing Using Face Detection and Skin Tone Information.
Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990. 1 page.
Wan, S.J. et al., "Variance-based color image quantization for frame buffer display", S. K. M. Wong Color Research and Application, 1990, pp. 52-58, vol. 15—Issue 1.
Yang, Ming-Hsuan et al., "Detecting Faces in Images: A Survey, ISSN:0162-8828. http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue 1, IEEE Computer.Society.

Zhang, Jun et al., "Face Recognition: Eigenface, Elastic Matching, and Neural Nets", Proceedings of the IEEE, 1997, pp. 1423-1435, vol. 85—Issue 9.
International Search Report and Written Opinion of the Preliminary Examining Authority, PCT/EP2007/006540, dated Nov. 8, 2007.
Written Opinion of the International Preliminary Examining Authority, PCT/EP2007/006540, dated Nov. 7, 2008.
Feraud, R. et al., "A Fast and Accurate Face Detector Based on Neural Networks," IEEE Trans. on Pattern Analysis, vol. 23, No. 1, Jan. 2001, pp. 42-53.
Froba, B. et al., "Face Detection with the Modified Census Transform," Proc. of the Sixth IEEE Intl. Conf., 2004, pp. 91-96.
Froba, B. et al., "Real Time Face Detection," Proc. of lasted "Signal and Image Processing," URL: http://www.embassi.de/publi/veroeffent/Froeba, 2002, pp. 1-6.
Mekuz, N. et al., "Adaptive Step Size Window Matching for Detection," Proc. of the 18th Intl. Conf. on Pattern Recog., vol. 2, Aug. 2006, pp. 259-262.
Rowley, Henry A., "Neural Network-Based Face Detection," Carnegie Melon Univ., Pittsburg, PA, May 1999, Ch. 6, p. 92, subsection 8.3.
Ryu et al., "Coarse-to-Fine Classification for Image-Based Face Detection," Image and Video Ret. Lect., LNCS, Springer-Verlag, vol. 4071, Jul. 2006, pp. 291-299.
Smeraldi, F. et al., "Facial Feature Detection by Saccatic Exploration of the Gabor Decomposition," Image Processing, 1998 Intl. Conf., Oct. 4, 1998, pp. 163-167.
PCT Transmittal of International Preliminary Examination Report, International Preliminary on Patentability, Chapter II of the Patent Cooperation Treaty, for PCT Application No. PCT/EP2007/006540, report dated Apr. 3, 2009, 24 pages.
Communication from the Examining Division, dated Jun. 27, 2012, for European patent application No. 07 765 248.5, 4 pages.
Letter on behalf of the Applicant, dated Dec. 15, 2009, for European patent application No. 07 765 248.5, including Amended claims filed after receipt of (European) search report, 18 pages.
Japanese Patent Abstracts, publication No. 2002-150287, publication date: May 24, 2002, Image Detector, Image Detection Method, Digital Camera and Printer.
Korean Patent Abstracts, publication No. 10-2005-0041772A, publication date: May 4, 2005, Method and Device for Detecting Face in Real-Time Through Face Detecting Mode or Face Tracking Mode, and Security Monitoring System Applying the Same.
Bernhard Froba, Andreas Ernst: "Face detection with the modified census transform", Proceedings of the Sixth IEEE International Conference on Automatic Face and Gesture Recognition, 2004, pp. 91-96, XP002455697.
Raphael Feraud, Olivier J. Bernier, Jean-Emmanuel Viallet, and Michel Collobert: "A Fast and Accurate Face Detector Based on Neural Networks" IEEE Transactions on Pattern Analysis and Machine Intelligence, IEEE Service Center, Los Alamitos, CA, US, vol. 23, No. 1, Jan. 1, 2001, pp. 42-53, XP001008995, ISSN: 0162-8828.
Bernhard Froba, Andreas Ernst, Christian Kulblbeck.: "Real time face detection" Proceedings of Lasted "Signal and Image Processing", Kauai, Hawaii, [Online] 2002, pp. 1-6, XP002455698, Retrieved from the Internet:URL:http://www.embassi.de/publi/veroeffent/Froeba.pdf> [retrieved on Oct. 23, 2007].
F. Smeraldi, J. Bigun: "Facial feature detection by saccadic exploration of the Gabor decomposition", International Conference on Image Processing, Chicago, IL, USA, Oct. 4-7, 1998, vol. 3, Oct. 4, 1998, pp. 163-167, XP010586874, ISBN: 0-8186-8821-1.
Nathan Mekuz, Konstantinos G. Derpanis, and John K. Tsotsos: "Adaptive Step Size Window Matching for Detection" Proceedings of the 18th International Conference on Pattern Recognition, Hong Kong, China, vol. 2, Aug. 2006, pp. 259-262, XP002455696. : "Adaptive Step Size Window Matching for Detection" Proceedings of the 18th International Conference on Pattern Recognition, Hong Kong, China, vol. 2, Aug. 2006, pp. 259-262, XP002455696.
Hanjin Ryu, Ja-Cheon Yoon, Seung Soo Chun, Sanghoon Sull: "Coarse-to-Fine Classification for Image-Based Face Detection" Image and Video Retrieval, Lecture Notes in Computer Science, (56) References Cited

OTHER PUBLICATIONS

LNCS, Springer-Verlag Berlin Heidelberg 2006, vol. 4071, Jul. 2006, pp. 291-299, XP019036040, ISBN: 3-540-36018-2.

Huang, J. and Gutta, S., Detection of human faces using decision trees, 2nd International Conference on Automatic Face and Gesture Recognition (FG '96). p. 248, IEEE Xplore, http://doi.ieeecomputersociety.org/10.1109/AFGR.1996.557272.

Jones, M., Viola, P., Fast multi-view face detection, Mitsubishi Electric Research Lab, 2003. http://www.merl.com/papers/docs/TR2003-96.pdf.

Rowley, H.A., Baluja, S. Kanade, T., Neural network-based face detection, IEEE Transactions on Pattern Analysis and Machine Intelligence, Jan. 1998, vol. 20, Issue: 1, pp. 23-38, ISSN: 0162-8828, DOI: 10.1109/34.655647, Posted online: Aug. 6, 2002. http://ieeexplore.ieee.org/xpl/freeabs_all.jsp?arnumber=655647&isnumber=14286.

Feng, G. C. and Yuen, P.C., Pattern Recognition 34 (2001), pp. 95-109. http://digitalimaging.inf.brad.ac.uk/publication/pr34-1.pdf.

Patent Abstracts of Japan, publication No. 11-146405, published on May 28, 1999, for Video Signal Processor and Color Video Camera Using the Same.

Patent Abstracts of Japan, publication No. 2005-316743, published on Nov. 11, 2005, for Image Processing Method and Device.

Patent Abstracts of Japan, publication No. 2006-254415, published on Sep. 21, 2006, for Apparatus, Method, and Program for Creating Luminance Conversion Curve.

Patent Abstracts of Japan, publication No. 2004-062651, published on Feb. 26, 2004, for Image Processor, Image Processing Method, Its Recording Medium and Its Program.

Patent Abstracts of Japan, publication No. 2002-015311, published on Jan. 18, 2002, for Image Recognizing Device, Shadow Removing Device, Shadow Removing Method, and Storage Medium.

Patent Abstracts of Japan, publication No. 2002-024811, published on Jan. 25, 2002, for Shadow Component Removing Device.

Patent Abstracts of Japan, publication No. 2006-119817, published on May 11, 2006, for Image Processor.

\* cited by examiner

FACE SEARCHING AND DETECTION IN A DIGITAL IMAGE ACQUISITION DEVICE

CROSS-REFERENCE TO RELATED APPLICATIONS

This application is a United States national stage filing under 35 U.S.C. 371 claiming benefit of priority to PCT application PCT/EP2007/006540, filed Jul. 23, 2007, which claims priority to provisional application 60/892,883, filed Mar. 5, 2007, both of which are to incorporated herein by reference.

FIELD OF THE INVENTION

The present invention provides an improved method and apparatus for image processing in digital image acquisition devices. In particular the invention provides improved performance and accuracy of face searching and detection in a digital image acquisition device.

BACKGROUND OF THE INVENTION

Several applications such as US published application no. 2002/0102024 to inventors Jones and Viola relate to fast-face detection in digital images and describe certain algorithms. Jones and Viola describe an algorithm that is based on a cascade of increasingly refined rectangular classifiers that are applied to a detection window within an acquired image. Generally, if all classifiers are satisfied, a face is deemed to have been detected, whereas as soon as one classifier fails, the window is determined not to contain a face.

An alternative technique for face detection is described by Froba, B., Ernst, A., "Face detection with the modified census transform", in Proceedings of $6^{th}$ IEEE Intl. Conf. on Automatic Face and Gesture Recognition, 17-19 May 2004 Page(s): 91-96. Although this is similar to Violla-Jones each of the classifiers in a cascade generates a cumulative probability and faces are not rejected if they fail a single stage of the classifier. We remark that there are advantages in combining both types of classifier (i.e. Violla-Jones and modified census) within a single cascaded detector.

Figure 1:
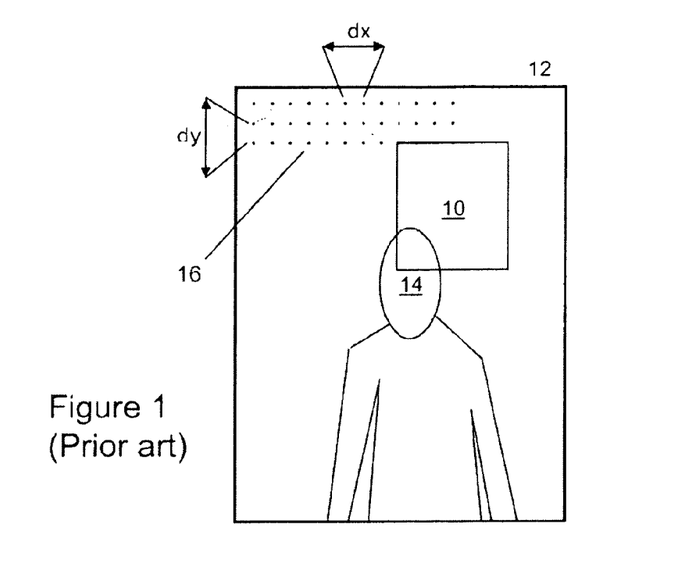
FIG. 1 illustrates schematically an image being processed by a conventional face detection process.

FIG. 1 illustrates what is described by Jones and Viola. For an analysis of an acquired image 12, the detection window 10 is shifted incrementally by dx pixels across and dy pixels down until the entire image has been searched for faces 14. The rows of dots 16 (not all shown) represent the position of the top-left corner of the detection window 10 at each face detection position. At each of these positions, the classifier chain is applied to detect the presence of a face.

Figures 2A, 2B:
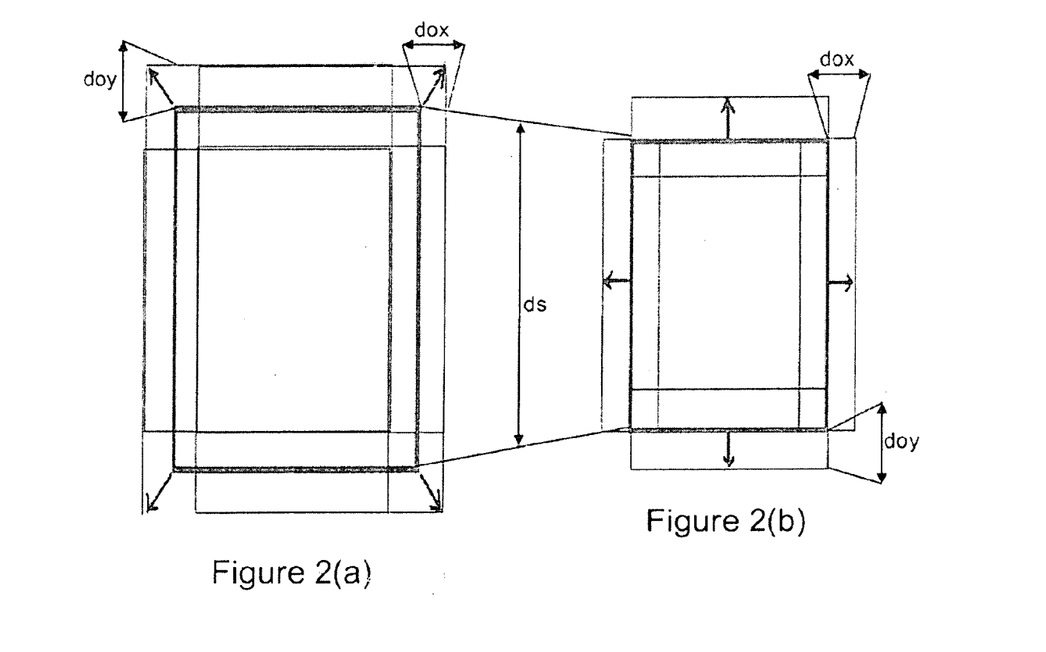
FIG. 2(a) illustrates a detection window oscillating diagonally around an initial position.
FIG. 2(b) illustrates a smaller scale detection window oscillating transversely around the initial position.

Referring to FIGS. 2a and 2b, as well as investigating the current position, neighboring positions can also be examined, by performing small oscillations around the current detection window and/or varying slightly a scale of the detection window. Such oscillations may vary in degree and in size creating consecutive windows with some degree of overlap between an original window and a second window. The variation may also be in the size of the second window.

A search may be performed in a linear fashion with the dx,dy increments being a pre-determined function of image resolution and detection window size. Thus, the detection is window may be moved across the image with constant increments in x and y directions.

A problem with linear searching occurs when the window size decreases, such as when attempting to detect small faces, and the number of sliding windows that are to be analyzed increases quadratically to the reduction in window size. This results in a compounded slow execution time, making "fast" face detection otherwise unsuitable for real-time embedded implementations.

U.S. application Ser. No. 11/464,083, filed Aug. 11, 2006, which is assigned to the same assignee as the present application, discloses improvements to algorithms such as those described by Jones and Viola, and in particular in generating a precise resolution corresponding to a representation of an image, such as an integral image or a Gaussian image, for subsequent lace detection.

SUMMARY OF THE INVENTION

A method of detecting a face in an image includes performing face detection within a first window of the image at a first location. A confidence level is obtained from the face detection indicating a probability of the image including a face at or in the vicinity of the first location. Face detection is performed within a second window at a second location that is determined based on the confidence level.

A number of windows that are analyzed is advantageously significantly reduced for a same face detection quality, and so faster face searching is provided, even in the case of small faces, therefore allowing acceptable performance for face detection in real-time embedded implementations such as in digital cameras, mobile phones, digital video cameras and hand-held computers.

BRIEF DESCRIPTION OF THE DRAWINGS

Embodiments will now be described, by way of example, with reference to the accompanying drawings, in which.

DETAILED DESCRIPTION OF THE PREFERRED EMBODIMENTS

An improved method of face searching and detection in a digital image acquisition device is described that calculates x and/or y increments of a detection window in an adaptive fashion.

In face detection processes, during analysis of a detection window and/or while oscillating around the detection window, a confidence level can be accumulated providing a probabilistic measure of a face being present at the location of the detection window. When the confidence level reaches a preset threshold for a detection window, a face is confirmed for location of the detection window.

Where a face detection process generates such a confidence level for a given location of detection window, in a preferred embodiment, the confidence level is captured and stored as an indicator of the probability ° la face existing at the given location. Such probability may reflect confidence that a lace has been detected, or confidence that there is no lace detected in the window.

Alternatively, where a face detection process applies a sequence of tests each of which produce a Boolean "Face" or "No face" result, the extent to which the face detection process has progressed through the sequence before deciding that no face exists at the location can be taken as equivalent to a confidence level and indicating the probability of a face existing at the given location. For example, where a cascade of classifiers fails to detect a face at a window location at classifier 20 of 32, it could be taken that this location is more likely to include a face (possibly at a different scale or shifted slightly) than where a cascade of classifiers failed to detect a face at a window location at classifier 10 of 32.

Figure 3:
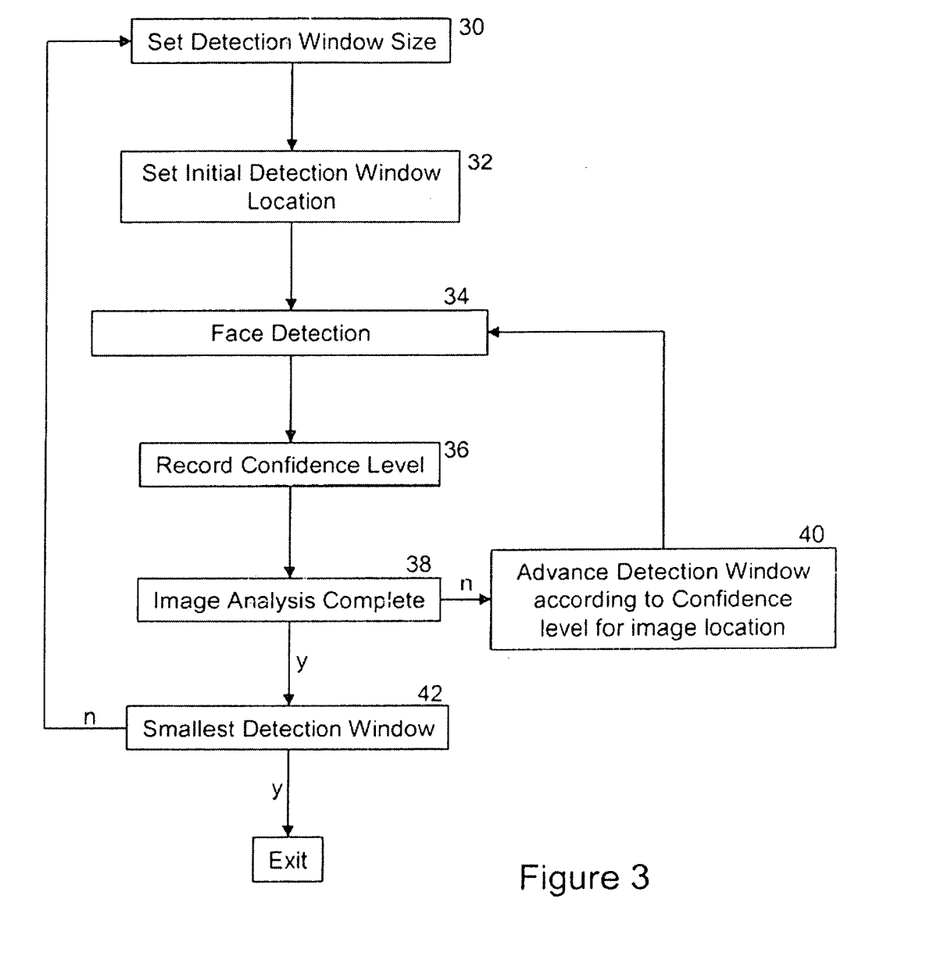
FIG. 3 is a flow diagram of a method of face searching and detection according to a preferred embodiment.

Referring now to FIG. 3, face searching and detection according to one embodiment, begins by selecting the largest size of detection window at step 30 and positioning the window at the top left corner of an image at step 32.

Alternatively, if particular regions of an image have been identified through some pre-processing as being more likely to include a face, the detection window can be located at a suitable corner of one such region and the embodiment can be applied to each such region of the image in turn or in parallel. Examples of such pre-processing include identifying regions of the image which include skin as being candidate face regions.

In this regard, it is possible to create a skin map for an acquired image where the value of a pixel within the skin map is determined by its probability of being a skin pixel.

There are many possible techniques for providing a skin map, for example:

(i) "Comparison of Five Color Models in Skin Pixel Classification", Zarit et al presented at ICCV '99 International Workshop of Recognition, Analysis, and Tracking of Faces and Gestures in Real-Time Systems, contains many references to tests for skin pixels:

(ii) U.S. Pat. No. 4,203,671, Takahashi et al., discloses a method of detecting skin color in an image by identifying pixels falling into an ellipsoid in red, green, blue color space or within an ellipse in two dimensional color space:

(iii) U.S. Pat. No. 7,103,215 describes a method of detecting pornographic images, wherein a color reference database is prepared in LAB color space defining a plurality of colors representing relevant portions of a human body. A questionable image is selected, and sampled pixels are compared with the color reference database. Areas having a matching pixel are subjected to a texture analysis to determine if the pixel is an isolated color or if other comparable pixels surround it; a condition indicating possible skin;

(iv) U.S. Ser. No. 11/624,683 filed Jan. 18, 2007 (Ref: FN185) discloses real-valued skin tests for images in RGB and YCC formats. So, for example, where image information is available in RGB format, the probability of a pixel being skin is a function of the degree to which L exceeds 240, where $L=0.3*R+0.59G+0.11B$, and/or the degree to which R exceeds G+K and R exceeds B+K where K is a function of image saturation. In YCC format, the probability of a pixel being skin a function of the degree to which Y exceeds 240, and/or the degree to which Cr exceeds $148.8162-0.1626*Cb+0.4726*K$ and Cr exceeds $1.2639*Cb-33.7803+0.7133*K$, where K is a function of image saturation.

It will also be understood that many different techniques exist to provide a binary skin/not-skin classification (typically based on simple thresholding). So, it can be understood that some pixels may qualify as skin under one binary technique and as not-skin tinder a second technique. So in alternative implementations, several binary techniques can be combined, so that pixels may be ranked according to a number of criteria to obtain a relative probability that any particular pixel is skin. It is advantageous to weight different skin detection techniques according to image capture conditions, or according to data analyzed from previous image frames.

Where multiple skin classification techniques are implemented in a parallel hardware architecture it becomes possible to combine to outputs of multiple skin classification techniques in a single analysis step, quickly generating a refined skin probability for each image pixel as it become available from the imaging sensor. In one preferred embodiment this refined skin probability is represented as a grayscale value, $2^N$ where N>1 (N=1 represents a simple binary mask of skin/not-skin). In any case, once an image pixel is classified by a non-binary algorithm it may be considered as a grayscale representation of skin probability.

In assessing whether various sizes and locations of windows in an image might include portions of skin, it can be advantageous to use the integral image techniques disclosed in US 2002/0102024, Violla-Jones with the skin map probability values produced for an image.

In such an integral image, each element is calculated as the sum of intensities i.e. skin probabilities of all points above and to the left of the point in the image. The total intensity of any sub-window in an image can then be derived by subtracting the integral image value for the top left point of the sub-window from the integral image value for the bottom right point of the sub-window. Also intensities for adjacent sub-windows can be efficiently compared using particular combinations of integral image values from points of the sub-windows.

Thus the techniques employed to construct an integral image for determining the luminance of a rectangular portion of the final image may equally be employed to create a skin probability integral image. Once this integral image skin map (IISM) is created, it to enables the skin probability of any rectangular area within the image to be quickly determined by simple arithmetic operations involving the four corner points of the rectangle, rather than having to average skin values over the full rectangle.

In the context of a fast face detector as described in the remainder of this specification, it can be understood that obtaining a rapid calculation of the averaged local skin pixel probability within a sub-window enables the skin probability to be advantageously employed either to confirm a local face region, or to be used as an additional, color sensitive classifier to supplement conventional luminance based Haar or census classifiers.

Alternatively or in combination with detection of skin regions, where the acquired image is one of a stream of images being analyzed, the candidate face regions might be face regions detected in previous frames, such as may be disclosed at U.S. application Ser. No. 11/464,083, (Ref: FN143) filed Aug. 11, 2006.

FIG. 2a illustrates the detection window oscillating diagonally around an initial position (outlined in bold). FIG. 2b illustrates a smaller scale detection window oscillating transversely around the initial position before further face detection is performed. These oscillations dox,doy and scale changes ds are typically smaller that the dx,dy step of the detection window. A decision as to scale oscillation depends on results of applying the search algorithm on the initial window. Typically, a range of about 10-12 different sizes of detection window may be used to cover the possible face sizes in an XVGA size image.

Returning to the operation of the main face detector, we note that ace detection is applied for the detection window at step 34, and this returns a confidence level for the detection window. The particular manner in which the detection window oscillates around a particular location and the calculation of the confidence level in the preferred embodiment is as follows:

Once a given detection window location has been tested for the presence of a face, the window is sequentially shifted by −dox,−doy; +dox,−doy; +dox,+doy; and −dox,−doy (as shown in FIG. 2(a)) and tested at each of these four locations. The confidence level for the window location and four shifted locations is accumulated. The confidence level may then be ported to each new window based on the new window size and location. If a target face-validation confidence threshold is not reached, the detection window is shrunk (indicated by ds). This smaller detection window is tested, then sequentially shifted by −dox,0; +dox,0; 0,+doy; and 0,−doy (as shown in FIG. 2(b)) and tested at each of these four locations. The confidence level for these five locations of the smaller scale detection window is added to the previous confidence level from the larner scale window.

The confidence level for the detection window location is recorded at step 36.

If the detection window has not traversed the entire image/region to be searched at step 38, it is advanced as a function of the confidence level stored for the location at step 40.

In the preferred embodiment, where the confidence level for an immediately previous detection window at the present window size has exceeded a threshold, then the x and y increment for the detection window is decreased.

Figure 4:
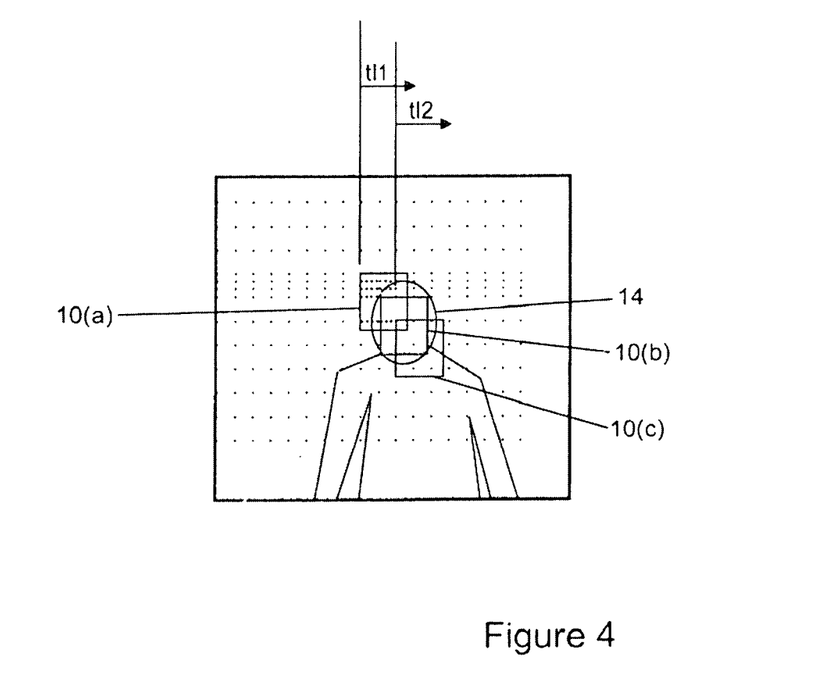
FIG. 4 illustrates schematically an image being processed according to a preferred embodiment.

Referring now to FIG. 4, which shows how in the preferred embodiment, the shift step is adjusted when the confidence level for a location signals the probability of a face in the vicinity of the location. For the first four rows of searching, a relatively large increment is employed in both x and y directions for the detection window. For the location of detection window 10(a), however, it is more than likely that the oscillation of the window in the bottom-right direction will provide the required confidence level of the face 14 being at the location. As such, the increment for the detection window in the x and y directions is decreased. In the example, the confidence level will remain above the determined threshold until the detection window location passes to the right of the line tl2. At this time, the x increment reverts to the original large increment. Having incremented by the small increment in the y direction, the detection window advanced on the next row with a large x increment until it reaches the line tl1. Either because the confidence level for this location will again exceed the required threshold or indeed because it did for the previous row, the x increment is again decreased until again the detection window passes to the right of the line tl2. This process continues until the detection window arrives at location 10(b). Here, not alone is the confidence level for increased resolution face detection reached, but the face 14 is detected. In the preferred embodiment, this causes both the x and y increments to revert to original large increments.

If a face is not detected in a region following a confidence level triggering at a face-like (but not an actual face) position, the x and y increments return to their original relaxed value, when over the whole extent of a row, the confidence levels do not rise above the threshold level. So for example, in the row after the detection window passes location 10(c), no detection window will produce a confidence level above the threshold and so after this row, the y increment would revert to its relaxed level, even if a face had not been detected at location 10(b).

Once the image and/or its regions have been traversed by a detection window of a given size, unless this has been the smallest detection window at step 42 of FIG. 3, the next smallest detection window is chosen at step 30, and the image traversed again.

In certain embodiments, when the confidence level for an immediately previous detection window at the present window size exceeds a threshold, a change in dx,dy for a detection window is triggered. However, this change could equally and/or additionally be a function of or be triggered by the confidence level for a bigger detection window or windows at or around the same location.

In certain embodiments, detection, windows are applied from the largest to the smallest size and so it is assumed that a given location has been checked by a larger sized detection window before a given sized detection window, so indicating that if a face has not been detected for the larger sized detection window, it is to be found near that location with a smaller sized detection window. Alternatively, it can indicate that even if a face has been found at a given location for a larger sized detection window, there is a chance that the face might be more accurately bounded by a smaller sized detection window around that location when subsequently applied.

As many more windows may be employed when looking for smaller size faces than larger faces, where confidence levels from larger detection windows are used to drive the increments for smaller detection windows, the savings made possible by embodiments of the present invention are greater than if smaller detection windows were applied first.

In the embodiments described above, for a given detection window size, either a large or small x or y increment is employed depending on whether or not a face is likely to be in the vicinity of a detection window location. However, the increment can be varied in any suitable way. So for example, the increment could be made inversely proportional to the confidence level of previous detection windows applied in the region.

Alternatively, instead of returning a quasi-continuous value as described above, the confidence level returned by the face detection process 34 could be discretely-valued indicating either: (i) no face: (ii) possible face: or (iii) face, each causing the advance step 40 to act as set out in relation to FIG. 4.

The detection window does not have to move along a row. Instead, its progress in each of the x and y directions may be adjusted from one increment to the next as a function of the confidence level of previous detection windows applied in the region.

The embodiments described above can be implemented in a digital image processing device such a digital stills camera, a digital video camera, camera phone or the like. The embodiments due to their computational efficiency can be implemented within a real-time face detection function which for example enables the device to highlight with a respective boundary (corresponding to a detection window) in a viewfinder faces detected in an acquired image or image stream.

Alternatively or in addition, the embodiments can be implemented within an off-line face detection function either within a digital image processing device or in a connected computing device to which an image is transferred or which has access to the image, to provide more efficient face detection.

Alternatively or in addition, the detected face regions can be employed with image post-processing functions such as red-eye detection and/or correction, or for example face expression detection and/or correction, or face recognition.

Where the detected face regions are employed in facial recognition, as many facial recognition systems remain sensitive to slight variations in either facial rotation or size, it is advantageous to apply post-processing measures in order to optimize the accuracy of facial recognition. This is because, even where frontal face regions are detected and saved, these regions may not be optimally aligned or scaled for the purposes of face recognition. Also, it should be noted that many images captured are consumer images and that subjects in such images will rarely maintain their faces in a squarely facing frontal position at the time of image acquisition.

Where as in the embodiment above, the face detection employed is highly optimized for speed and for the accurate determination of the presence of a face region, face detection is typically not optimized to accurately match the precise scale, rotation or pose of a detected face region.

There are many techniques known in the prior an for achieving such normalization, however, in an embedded imaging device, such as a digital camera, where processing must be both compact in terms of code footprint and efficient resource usage, it can be impractical to deploy more of such complex processing.

Thus, in one embodiment the face detector, already available within the image acquisition device, can be re-purposed for use in post-processing of detected/tracked face regions. In the embodiment, a supplementary frontal face detector which is generally to identical to a standard detector, but highly optimized at the training stage to detect only frontal faces is employed. So for example, the frontal face detector would not be suitable for normal face detection/tracking where a more relaxed detector, hereafter referred to as a standard detector is required.

Figure 5:
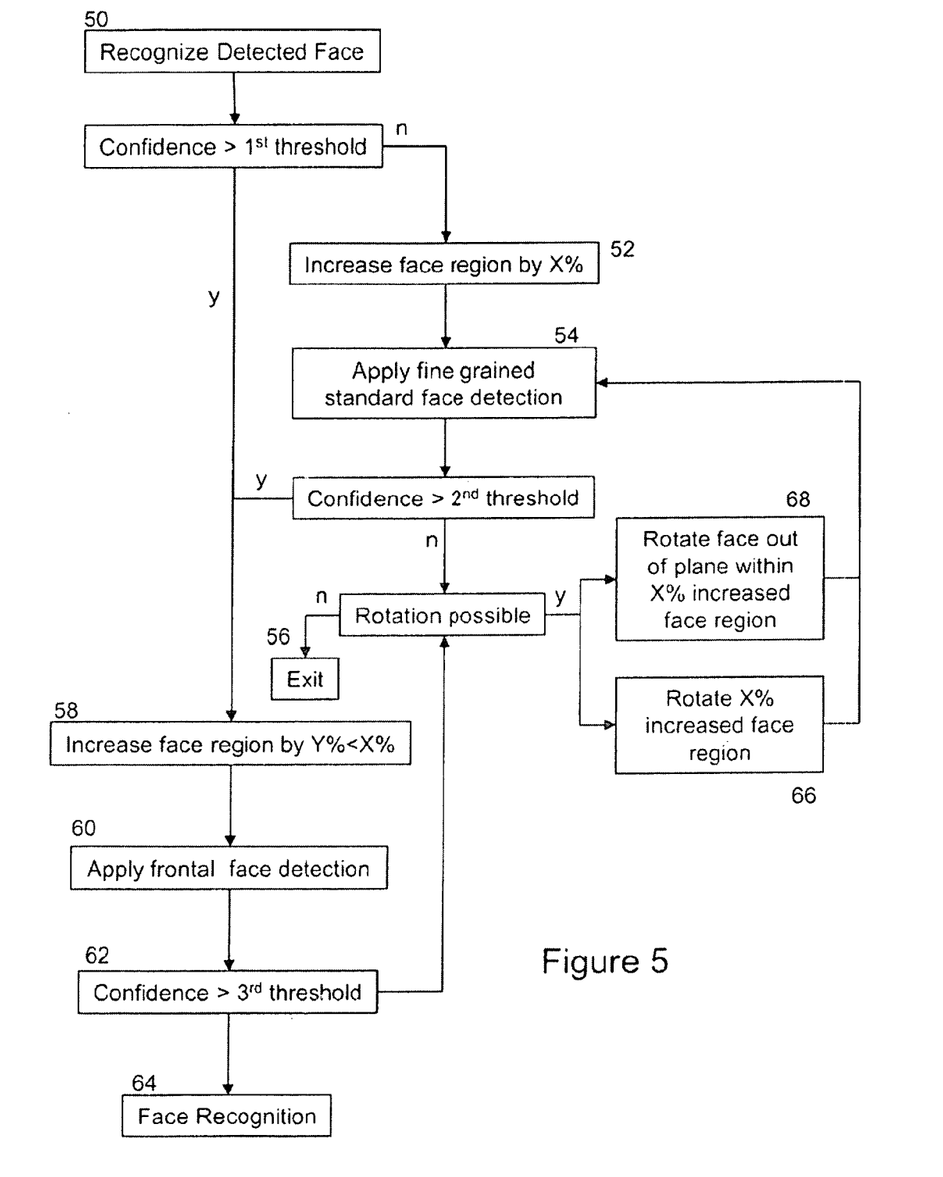
FIG. 5 is a flow diagram illustrating post-processing of a detected face region prior to face recognition.

Referring now to FIG. 5, in this embodiment, if a face region to which face recognition is to be applied is originally detected, step 50, with an initial probability less than a $1^{st}$ threshold, the region is expanded by say, X=20% to include a surrounding peripheral region and extracted from the acquired image, step 52. This larger region is typically sufficient to contain the entire face.

A standard detector is next applied to the expanded region, step 54, but across a smaller range of maximum and minimum scales, and at finer granular resolution than would be employed across a full image.

As an example, at step 54, the detector might scale from 1.1 to 0.9 times the size of the face region determined by the original detection process, step 50, but in increments of 0.025; thus 0.9, 0.925, 0.95, 0.975, 1.00, and so on, and similarly with step size. The goal is to determine a sub-window optimized in scale and alignment within the extracted, expanded face region where the face probability is highest. Ideally, such a sub-window will exceed a $2^{nd}$ threshold probability for face detection no less than the $1^{st}$ threshold. If not, and if rotation is not to be applied in an attempt to improved this probability, then this face region is marked as "unreliable" for recognition, step 56.

Where the first or second thresholds are exceeded then either the sub-window for the originally detected face region or the optimized window from step 54 are expanded by say Y=10%<X, step 58.

The frontal face detector is then applied to the expanded region, step 60. If a sub-window with a face detection probability above a third threshold (higher than each of the first and second thresholds is identified), step 62, then that sub-window is marked as "reliable" and is passed on to a recognition process, step 64.

Where the frontal face detection step fails at step 62, but we know there is a high probability lace region, then it is likely that one or both of a small rotational or pose normalization is also required to produce a face region suitable for face recognition.

In one embodiment, the original X % expanded face region is next rotated through one of a number of angular displacements, say −0.2, −0.15, −0.1, −0.05, 0.0, +0.05, +0.1, +0.15 and +0.2 radians, step 66, and the Fine grained standard face detection and possibly frontal face detection steps are re-applied as before.

Ideally, the face probability will increase above the required $3^{rd}$ threshold as these angular rotations are applied to the extracted face region and the face region can be marked as "reliable". It will also be seen that the potentially changing probabilities from face region rotation can also be used to guide the direction of rotation of the region. For example, if a rotation of −0.05 radians increases the face detection probability but not sufficiently, then the next rotation chosen would be −0.1 radians. Whereas if a rotation of −0.05 radians decreases the face detection probability, then the next rotation chosen would be 0.05 radians and if this did not increase the face detection probability, then the lace region could be marked as "unreliable" for recognition, step 56

As an alternative or in addition to this in-plane rotation of the face region, an AAM (Active Appearance Model) or equivalent module can be applied to the detected face region in an attempt to provide the required pose normalization to make the face region suitable for lace recognition. AAM modules are well known and a suitable module for the present embodiment is disclosed in "Fast and Reliable Active Appearance Model Search for 3-D Face Tracking", F Dornaika and J Ahlberg, IEEE Transactions on Systems, Man, and Cybernetics-Part B: Cybernetics, Vol 34, No. 4, pg 838-1853, August 2004, although other models based on the original paper by T F Cootes et al "Active Appearance Models" Proc. European Conf. Computer Vision, 1998, pp 484-498 could also be employed.

In this embodiment, the AAM model has two parameters trained for horizontal and vertical pose adjustments, and the AAM model should converge to the face within the detected face region indicating the approximate horizontal and vertical pose of the face. The face region may then be adjusted by superimposing the equivalent AAM model to provide a "straightened" face region rotated out of the plane of the image, step 68.

Again, fine grained standard face detection and frontal face detection steps are re-applied, and if the threshold for the detected face region(s) is not above the required probability, then small incremental adjustments of the horizontal and vertical pose may be stepped through as before until either the frontal face detector probability increases sufficiently to mark the face region as "reliable" or the face region is confirmed to be "unreliable" to use for fade recognition, purposes.

U.S. patent application Ser. No. 11/752,925 filed May 24, 2007. (Ref: FN172) describes to capturing face regions from a preview stream and subsequently aligning and combining these images using super-resolution techniques in order to provide a repair template for portions of a facial region in a main acquired image. These techniques may be advantageously employed, in addition to or as an alternative to the steps above, independently or as part of a post-processing step on a face region in order to bring the face region into a substantially frontal alignment before face recognition.

In other alternative applications for detected face regions, the selected regions may be consecutively applied to a series of images such as preview images, post-view images or a video stream of full- or reduced-resolution images, or combinations thereof, where the confidence level as well as the window locations are passed from one preview image, post-view image, etc., to the next.

While an exemplary drawings and specific embodiments of the present invention have been described and illustrated, it is to be understood that that the scope of the present invention is not to be limited to the particular embodiments discussed.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

The invention claimed is:

1. One or more non-transitory processor-readable media having code embedded therein for programming a processor to perform a method of detecting a face in an image, the method comprising:
   performing face detection within a first relatively large window of said image at a first location;
   obtaining from said face detection a confidence level that is below a threshold indicating a probability that no face is present at or in a vicinity of said first location;
   performing second face detection within a second relatively large window of said image at a second location displaced from the first location by a first x-amount in a first direction and/or by a first y-amount in an orthogonal second direction;
   obtaining from said second face detection a confidence level that is at or above said threshold indicating a probability that the image at least may include a face in the vicinity of the second location;
   applying a sequence of windows, including relatively smaller windows than said second relatively large window, at further locations in the vicinity of said second location, including a third location that is displaced from the second location by a second x-amount that is smaller than the first x-amount in the first direction and/or by a second y-amount that is smaller than the first y-amount in the orthogonal second direction wherein a magnitude of displacement by respective values of x-amount in a first direction and/or by respective values of y-amount in an orthogonal second direction is variable between successive windows of said sequence of windows within said image and wherein said x-amount and/or said y-amount decreases between successive windows when a confidence level indicating that the image at least may include a face increases across one or more further thresholds,
   wherein the method further comprising repeating the obtaining of confidence levels until face detection for multiple predetermined sizes of windows has been performed over an entire region of interest of said image.

2. One or more processor-readable media as claimed in claim 1, wherein the method further comprising repeating the obtaining of confidence levels below the threshold for multiple additional windows in different locations indicating probabilities in each case that no face is present at the different locations before said performing said second face detection.

3. One or more processor-readable media as claimed in claim 1 wherein the method further comprising repeating the obtaining of confidence levels for multiple additional windows in different locations until face detection has been performed over an entire region of interest.

4. One or more processor-readable media as claimed in claim 3, wherein dimensions of said one or more additional windows depend on said confidence level.

5. One or more processor-readable media as claimed in claim 1, wherein the method further comprising
   determining a set of regions of interest for said image, and repeating the obtaining of confidence levels for each of said regions of interest of said set.

6. One or more processor-readable media as claimed in claim 1, wherein the method further comprising identifying at least one region of said image likely to contain a face; and repeating the obtaining of confidence levels until face detection is performed over substantially an entirety of said at least one region.

7. One or more processor-readable media as claimed in claim 1, wherein the method further comprising identifying at least one region of said image likely to contain a face; and repeating the obtaining of confidence levels until face detection is performed concentrically inside said at least one region.

8. One or more processor-readable media as claimed in claim 1, wherein said face detection comprises applying a chain of classifiers to said windows of said image and wherein said confidence level comprises a function of a number of classifiers successfully applied to said windows.

9. One or more processor-readable media as claimed in claim 1, wherein the face detection window at the third location includes a portion that does not overlap the second window.

10. One or more processor-readable media as claimed in claim 9, wherein a size of the third window relative to a size of said second window is also decreased based on a confidence level of said third face detection increasing across at least one further threshold.

11. One or more processor-readable media as claimed in claim 1, wherein the magnitude of the second x-amount or the magnitude of the second y-amount, or both, are greater than the respective magnitudes of the first x-amount or the second y-amount, or both, for a higher confidence level that the image does not include a face at the first location compared with the second location.

12. One or more processor-readable media as claimed in claim 1, wherein the x-amount and the y-amount displacement magnitudes between at least two successive locations depend separately on face detection confidence levels in the first and second orthogonal directions, respectively.

13. One or more processor-readable media as claimed in claim 1, wherein when there is a confidence level above a threshold value that a face is detected in the vicinity of said first location, then the second location is selected such that the second window overlaps said first window to center on said face, and when there is a confidence level below said threshold, the second location is selected so that the second window does not overlap the first window.

14. One or more processor-readable media as claimed in claim 1, wherein the method further comprising pre-determining one or more regions of interest within the image each as having an enhanced likelihood of including a face, and locating a detection window at a suitable corner of each such region of interest, and applying to each such region of interest a sequence of windows, including applying at said suitable corner a face detection window of relatively larger size than a subsequent face detection window that is applied upon moving a first displacement magnitude amount to a subsequent location upon obtaining a confidence level above at least one of said further thresholds for face detection at a previous location, and displacing a smaller magnitude of displacement distance from the previous location to the subsequent location when said level of confidence that a face may exist at the previous location exceeds said at least one of said further thresholds.

15. One or more processor-readable media as claimed in claim 14, wherein said applying said sequence of windows to said region of interest comprises applying said sequence of windows to two or more regions of interest in time periods with at least some temporal overlap.

16. One or more processor-readable media as claimed in claim 14, wherein said one or more regions of interest comprise one or more regions including a number of skin pixels.

17. One or more processor-readable media as claimed in claim 14, wherein said image comprises is an image in a stream of images and wherein said regions of interest comprise one or more regions in which a face has been detected in a previous image of said stream.

18. One or more processor-readable media as claimed in claim 1, comprising:
responsive to said confidence level indicating a face at or in the vicinity of said first location, performing detection of a frontally aligned face within a second window at a second location wherein said second location is determined based on a confidence level indicating a probability of a candidate region including said face at or in the vicinity of said first location.

19. One or more processor-readable media as claimed in claim 18 wherein the method further comprising:
responsive to detection of a frontally aligned face in any candidate region, selectively applying face recognition to said candidate region.

20. One or more processor-readable media as claimed in claim 19, further comprising applying face recognition in response to any candidate region having a probability of including a face greater than a predetermined threshold.

21. One or more processor-readable media as claimed in claim 18 wherein said performing detection of a frontally aligned face is performed in a candidate region including said face detected at or in the vicinity of said first location.

22. One or more processor-readable media as claimed in claim 21 wherein performing detection of a frontally aligned face is performed in response to said candidate region having a probability of including a face greater than a first threshold.

23. One or more processor-readable media as claimed in claim 21 wherein the method further comprising:
responsive to said first location having a probability of including a face less than a first threshold, extracting an extended region including said first location from said image and performing face detection in said extended region with a relatively fine granularity to provide said candidate region.

24. One or more processor-readable media as claimed in claim 21 wherein the method further comprising:
responsive to a candidate region having a probability of including a face less than a second threshold, rotating an extended region including said face region through one of a sequence of angles and performing face detection in said rotated extended region with a relatively fine granularity to provide another candidate region.

25. One or more processor-readable media as claimed in claim 21 wherein the method further comprising:
responsive to a candidate region having a probability of including a face less than a second threshold, rotating said face within an extended region through one of a sequence of angles and performing face detection in said extended region with a relatively fine granularity to provide another candidate region.

26. A digital camera, comprising: a processor; and one or more processor readable media having code embedded therein for programming the processor to perform a method of detecting a face in an image in accordance with any of claims 1, 2-4, 5-8, 9-10, or 11-25.

27. A method of detecting a face in an image in accordance with any of claims 1, 2-4, 5-8, 9-10, or 11-25.

* * * * *

UNITED STATES PATENT AND TRADEMARK OFFICE
CERTIFICATE OF CORRECTION

PATENT NO. : 8,649,604 B2  
APPLICATION NO. : 12/374040  
DATED : February 11, 2014  
INVENTOR(S) : Mihnea Gangea et al.

Page 1 of 1

It is certified that error appears in the above-identified patent and that said Letters Patent is hereby corrected as shown below:

On the Title page, [75] Inventors:
 delete "Mihnea Gangea, Bucharest (RO);" and insert --Mihnea Gangea, Bucuresti (RO);--
 delete "Stefan Mirel Petrescu, Bucharest (RO);" and insert --Stefan Mirel Petrescu, Bucuresti (RO);--
 delete "Andrei Vasiliu, Bucharest (RO);" and insert --Andrei Vasiliu, Bucuresti (RO);--

Title page 3, References Cited, column 2:
 delete "2005/0041121 A1 1/2005 Player et al" and insert --2005/041121 A1 2/2005 Steinberg et al.--
 delete "2005/0275721 A1 2/2005 Goshert" and insert --2005/0275721 A1 12/2005 Ishii, Yusuke--

In the claims:

Claim 5, column 10, line 7  Before "said" insert --all--

Signed and Sealed this  
Thirtieth Day of December, 2014

Michelle K. Lee  
*Deputy Director of the United States Patent and Trademark Office*